June 4, 1935.  S. JENCICK  2,003,508
PROPELLER SHAFT
Filed Aug. 4, 1930
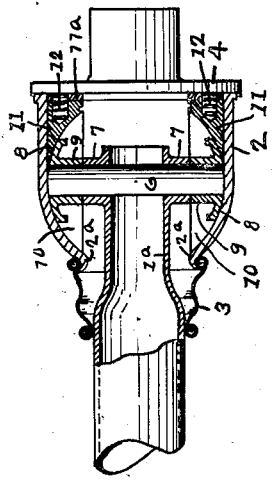
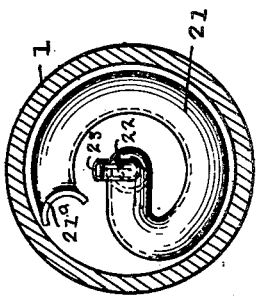
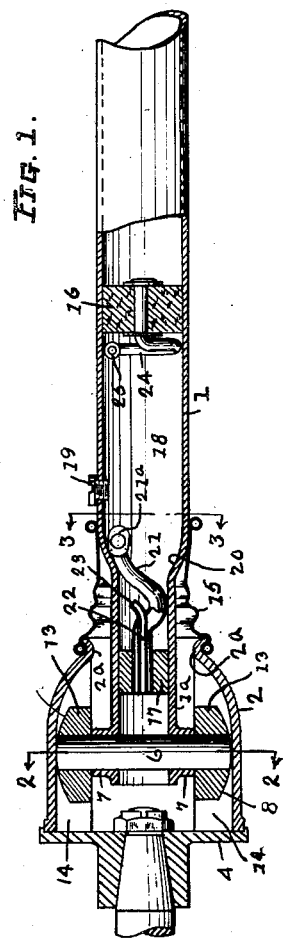
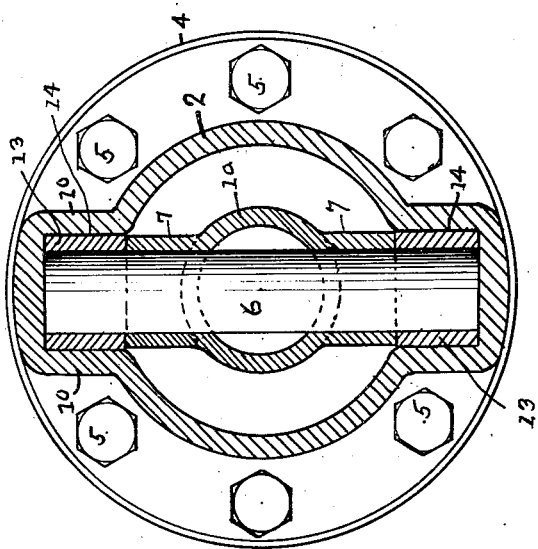
INVENTOR.
STEPHEN JENCICK.
ATTORNEYS.

UNITED STATES PATENT OFFICE 2,003,508

PROPELLER SHAFT

Stephen Jencick, Chagrin Falls, Ohio

Application August 4, 1930, Serial No. 473,091

15 Claims. (Cl. 64—89)

This invention relates to an improved form of automobile propeller shaft.

One object of the present invention consists in devising a propeller shaft with a lubricant reservoir from which the lubricant will be automatically fed to the universal couplings at a predetermined rate, as may be required.

A further object consists in devising a one-piece, hollow, tubular propeller shaft with efficient universal couplings and with a single reservoir provided in the shaft from which lubricant will be supplied to both couplings.

A still further object consists in devising such a shaft and lubricant feeding means in which the supply of the lubricant to the universal couplings will be controlled by the starting and stopping of the rotative movement of the shaft so that the lubricant will be fed to the couplings only upon starting and stopping of such rotative movement.

Other objects will appear from the following description and claims when considered together with the accompanying drawing.

Fig. 1 shows my improved shaft and couplings partly in elevation and partly in section; Fig. 2 is taken on line 2—2 of Fig. 1; and Fig. 3 is taken one line 3—3 of Fig. 1. Figs. 2 and 3 show the front end of the shaft.

The hollow, one-piece, tubular shaft 1 is continuous throughout the entire extent between the two universal couplings which are connected to the two ends thereof. The two universal couplings have duplicate outer casings 2 of cylindrical form throughout the main body portion thereof. The inner portion of each casing 2 is of a tapering form and has a bead portion 2ª to provide engagement for the one edge portion of the collar 3 which engages the hollow shaft 1 at its other edge portion and which may consist of leather or any other suitable form of flexible material. The edge portions of the collar 3 are tightly engaged with the casing 2 and the tubular member 1. The larger end of each casing 2 is closed by the plate 4 which is provided with suitable means of connection for the rest of the drive mechanism. These plates are secured in position by means of the bolts 5. That portion of the tubular shaft 1 which enters the casing 2 at each end thereof is of a reduced diameter and has extending transversely through the end portion thereof the pin 6. The projecting necks 7 are provided upon diametrically opposite sides of the end portion 1ª of the tubular member so as to afford suitable engagement for the pin 6. The extreme end portions of the pin 6 engage in the shoes, each of which has a curved base portion 8 and a cylindrical neck portion 9, the curvature of the base portion corresponding with that of the inner surface of the casing 2. The neck portions 9 extend to and abut the portions 7. These shoes are mounted for movement in a single plane within the diametrically opposite recesses provided in the sides of the coupling 2 between the parallel walls 10.

The wedge-shaped members 11 have their inner surfaces curved so as to correspond with the curvature of the inner surface of the coupling 2 and also with the curvature of the outer surface 8 of the shoes. The wedge members 11 are mounted within the same recesses in which engage also the shoes, and are maintained in proper position with respect to the shoes by means of the coil springs 12 which are seated in suitably formed recesses in the wedge members 11 and which engage also the inner surface of the end cover plate 4. These wedge members are connected together by the centrally apertured and transversely extending plate 11ª, to which they may be welded or with which they may be formed as integral parts. Thus, the hollow shaft is permitted to turn about the axis of the pin 6 while adjustment in a plane at right angles thereto is permitted by movement of the shoes within their recesses and about the center of the coupling. In this way there is afforded universal movement.

The coupling at the front end of the shaft comprises a duplicate form of casing 2 into which the reduced end portion 1ª of the tubular shaft extends. The end portion 1ª is provided also with the neck portions 7 through which extends the pin 6 so as to afford movement in one plane. The extreme end portions of the pin in this case extend into the shoes 13 which have their outer surfaces curved so as to afford movement in the plane at right angle to the other plane of movement and about the center of the coupling. These shoes 13 are mounted within the recesses 14 provided at diametrically opposite sides of the casing 2 and this structure permits also a longitudinal relative movement between this end portion of the hollow shaft and the casing 2. The tapered inner end portion of the casing 2 at this end of the shaft is provided also with the same form of flexible covering 15, as at the other end. The coupling casing including the leather collar connections are oil-tight.

The space within the hollow shaft 1 between the plug 16 of cork or the like and the metal plug 17, is employed as an oil reservoir 18 for the purpose of lubricating the universal couplings. The supply opening through the wall of this reservoir is closed by means of the screw plug 19. The reservoir will be only incompletely filled so as to leave a space for a purpose to be hereinafter explained. Extending through the plug 17 is a tube which has its other end portion formed as a spiral, as indicated at 21, and which terminates at a point in proximity to the wall of the reservoir. This end of the tube 21 is formed as a flared mouth 21ᵃ which opens in the direction the same as that of the rotation of the shaft 1. As will be seen from the drawing, the other end of the tube 21 opens into the casing 2 of the universal coupling. Arranged concentrically with respect to the straight portion of the tube 21 and extending therethrough so as to be supported thereby is the comparatively smaller tube 22 which extends for the most part axially with respect to the reservoir. The one end of the tube 22 opens into the space within the coupling, while the other end is somewhat curved, as indicated at 23, so as to open at a point somewhat away from the center of the reservoir for a purpose to be explained.

Extending through the cork plug 16, there is provided also another spiral tube 24 which opens at its one end within the space upon the side of the plug toward the rear coupling so as to feed oil thereto while its other end opens in the form of a flared mouth 25 at a point in proximity to the inner wall of the reservoir 18. The mouth 25 also opens in a direction the same as that of the rotative movement of the shaft. The oil will run down the shaft to the rear coupling.

Upon installation of the present structure, both couplings are properly supplied with oil and the reservoir 18 is also filled with oil up to the proper point. In filling the reservoir, there must be left sufficient space to insure the uncovering of the inner end of tube 22 during continued rotation of the shaft, as will be explained. When standing idle, the oil is held in the reservoir because of its closed condition and lack of air pressure to permit the oil flow therefrom. Upon the initial rotative movement, some oil will be scooped by the mouth of each tubes 21 and 24 and forced into the couplings. Then as the rotation continues, the centrifugal force will cause the oil in the reservoir 18 to hug the wall thereof and to thereby form a core of air along the longitudinal axis thereof. At the same time, the oil within the tubes 21 and 24 will hug the inner surfaces thereof and because of the centrifugal force, will be prevented from passing through these tubes into the couplings. As the oil in the reservoir 18 then adheres to the inner surface thereof, it will close the mouth portion 21ᵃ of the tube 21 and likewise, it will close also the mouth portion of the tube 24. It is to be noted that the mouth portions of these two spiral tubes are located in such proximity to the wall of the reservoir that upon rotation of the shaft, the oil will cover the mouth portions of these two tubes. At the same time, the formation of the longitudinal air core within the reservoir will expose the end 23 of the small tube 22 to such air, and the suction created within the air core due to the centrifugal force will cause air to be drawn from the coupling through the tube 22 into the air core within the oil reservoir. This condition will continue and no oil will be fed to the couplings so long as the shaft is being rotated. Then when the rotation of the shaft is stopped, the oil will settle within the reservoir by gravity and the end 23 of the smaller tube will be closed and sealed by the oil which then covers the same. The air within the reservoir 18 will then find its way to the top portion thereof. The air pressure within the reservoir will then cause a certain quantity of the oil to flow therefrom through the spiral tubes into the couplings according to the quantity of air which has been drawn from the coupling into the reservoir during the rotation of the shaft. This quantity is determined by the size of tube 22, and the point of opening of its inner end, and the location of the inner end of the tube 22 determines the exact time when this tube is uncovered and later becomes sealed by the oil upon stopping of the rotative movement of the shaft. This end portion of the tube may be given the proper curvature according to the principle just stated.

Thus, I have devised a self-oiling propeller shaft which requires but a single reservoir for the lubricating oil and which will be actuated for the lubrication of the universal couplings only upon the starting and stopping of the rotative movement of the shaft. That is, such lubrication will not take place during the continued rotation of the shaft but only upon the initiation and stopping of the rotative movement of the same. Neither will the lubricant be fed to the couplings while the shaft is in continuous idle position. The couplings are automatically supplied with a sufficient quantity of oil which is predetermined according to the factors above referred to. Also, the oil will serve more efficiently as a lubricant than the grease which has heretofore been so commonly used, as the oil will be sprayed to all parts of the couplings.

Furthermore, I have devised a comparatively light weight shaft which is free of joints and which requires comparatively less material and labor in the manufacture of the same and therefore means a saving in cost. The automatic lubrication of the couplings is more positive and dependable than the present system which requires a manual servicing of the couplings from time to time with the danger of the couplings becoming dry and the consequent lack of efficiency and danger incident thereto. Thus, the present form of propeller shaft is more efficient than the one which is in use at the present time as standard equipment in the automotive industry.

In the device here presented, the form of universal coupling is comparatively simple in its structure and is at the same time efficient and dependable and not costly to manufacture.

Other advantages will be apparent to those who are skilled in the art to which the present invention relates.

What I claim is:

1. An automobile propeller shaft comprising a one-piece continuous, hollow tubular member, universal couplings provided directly upon the two ends thereof, and means for automatically lubricating said couplings only upon starting and stopping of the shaft rotation.

2. An automobile propeller shaft comprising a one-piece continuous, hollow tubular member, universal couplings provided directly upon the two ends thereof, a lubricant reservoir provided within said tubular member and intermediate the ends thereof, and means for automatically supplying lubricant therefrom to said couplings only upon starting and stopping of the shaft rotation.

3. An automobile propeller shaft comprising a one-piece continuous, hollow tubular member, universal couplings provided directly upon the two ends thereof, and means for automatically lubricating said couplings to a predetermined degree only upon starting and stopping of the shaft operation.

4. In a device of the class described, the combination of a propeller shaft, and means for automatically lubricating the same to a predetermined degree only upon starting and stopping of the shaft operation.

5. In a device of the class described, the combination of a propeller shaft, universal couplings therefor, a lubricant reservoir associated with said shaft, and means for automatically supplying lubricant from said reservoir to said couplings to a predetermined degree only upon starting and stopping of the shaft rotation.

6. In a device of the class described, the combination of a propeller shaft, universal couplings therefor, a lubricant reservoir associated with said shaft, means for preventing the passage of lubricant from the reservoir to the universals during continued rotation of said shaft, and means for automatically feeding lubricant from the reservoir to said universals upon the stopping of such rotary movement of said shaft.

7. In a device of the class described, the combination of a propeller shaft, universal couplings therefor, a lubricant reservoir associated with said shaft, centrifugal means for preventing the passage of lubricant from the reservoir to the universals during continued rotation of said shaft, and means for automatically feeding lubricant from the reservoir to said universals upon the stopping of such rotary movement of said shaft.

8. An automobile propeller shaft comprising a one-piece, continuous, hollow tubular member, universal couplings provided directly upon the two ends thereof, a lubricant reservoir provided within said tubular member, a substantially spiral means of communication between said reservoir and each coupling for the delivery of lubricant to the couplings, and a substantially straight means of communication between said reservoir and one of said couplings for the transfer of air pressure to said reservoir, said spiral means having one end located adjacent the wall of said reservoir; and said straight means having one end located in the axial region of said reservoir, whereby during continued rotation of the shaft, the lubricant will be precluded from delivery through said spiral means and air will be permitted to pass through said straight means to said reservoir, and upon conclusion of such rotation of the shaft, the air in said reservoir will cause lubricant to be delivered through said spiral means to said couplings.

9. An automobile propeller shaft comprising a one-piece, continuous, hollow tubular member, universal couplings provided directly upon the two ends thereof, one end of said shaft opening into one of said couplings, a plug in said shaft near the one end thereof, a second plug in said shaft at a space from said first plug so as to provide a lubricant reservoir between said plugs, a tubular member extending centrally through each of said plugs and having spiral portions within said reservoir and having their ends opening in a direction the same as that of the shaft rotation and in proximity to the wall of the hollow shaft, a tube of restricted cross section extending axially through one of said plugs and providing air communication from the one coupling and said reservoir and having its one end terminating in said reservoir at a point between the axis of the reservoir and the corresponding end of said spiral member, whereby the lubricant is precluded from being delivered to the couplings during continued rotation of the shaft and is delivered to the couplings upon the starting and stopping only of such rotation of the shaft.

10. An automobile propeller shaft comprising a one-piece, continuous, hollow tubular member, a universal coupling casing at each end of said shaft, a universal connecting means provided between each end of the shaft and the inside of the corresponding coupling casing, one of said couplings being capable also of longitudinal adjustment between the casing and shaft, and said other coupling having an automatically adjustable abutment means for the end of the shaft within its casing, said abutment means conforming to the universal movement of said coupling.

11. In a device of the class described, the combination of a propeller shaft, a casing into which the end portion of the shaft projects, said casing having diametrically oppositely disposed recesses each provided with straight parallel sides and an intermediate surface curved about the center of the coupling, shoes in said recesses having straight sides and outer curved surfaces adapted for oscillating adjustment in co-operation with the curved surfaces of said recesses, a pin extending through said shaft and having its ends mounted within said shoes so as to permit adjustment between said shaft and shoes in a plane normal to said first plane of adjustment, whereby there may be obtained a rotative drive connection and a universal adjustment between the shaft and casing, an automatically adjustable seating wedge member arranged in the outer end portion of each of said recesses and having its inner surface merging in continued curvature with that of its recess so as to form part of the bearing surface for its shoe, and means of connection for said casing in a drive mechanism.

12. An automobile propeller shaft comprising a one-piece continuous hollow tubular member, universal couplings provided directly upon the two ends thereof, said tubular member being formed with a lubricant reservoir, and there being located within said shaft a means which is rendered effective by motion of the lubricant within the reservoir for automatically feeding the lubricant from the reservoir to said coupling.

13. An automobile propeller shaft comprising a one-piece continuous hollow tubular member, universal couplings provided directly upon the two ends thereof, a single lubricant reservoir located within and intermediate the ends of the hollow shaft, and there being located within said shaft a means which is rendered effective by motion of the lubricant within the reservoir for automatically feeding the lubricant from the reservoir to said coupling.

14. An automobile propeller shaft comprising a one-piece continuous, hollow tubular member, universal couplings provided directly upon the two ends thereof, a single lubricant reservoir located within and intermediate the ends of the hollow shaft, and there being located within said shaft a means which is rendered effective upon the initial rotation of said shaft for effecting flow of the lubricant from said reservoir for automatically lubricating both of said universal couplings.

15. An automobile propeller shaft comprising a one-piece continuous, hollow tubular member of substantially uniform diameter through at least the main portion thereof, universal couplings provided directly upon the two ends thereof, a single lubricant reservoir provided within said tubular member and intermediate the ends thereof, and means located within said shaft for effecting the flow of lubricant upon the initial rotation of said shaft due to the lag of the lubricant for automatically lubricating both of said universal couplings and for effecting the termination of the flow of lubricant when the lubricant in the reservoir rotates at a speed equal to the shaft speed.

STEPHEN JENCICK.